(12) United States Patent
Hayashi

(10) Patent No.: US 7,655,585 B2
(45) Date of Patent: Feb. 2, 2010

(54) OPTICAL GLASS, PRECISION PRESS-MOLDING PREFORM, PROCESS FOR THE PRODUCTION THEREOF, OPTICAL ELEMENT AND PROCESS FOR THE PRODUCTION OF THE ELEMENT

(75) Inventor: Kazutaka Hayashi, Yokohama (JP)

(73) Assignee: Hoya Corporation, Tokyo (JP)

( * ) Notice: Subject to any disclaimer, the term of this patent is extended or adjusted under 35 U.S.C. 154(b) by 322 days.

(21) Appl. No.: 11/512,420

(22) Filed: Aug. 30, 2006

(65) Prior Publication Data

US 2007/0049483 A1 Mar. 1, 2007

(30) Foreign Application Priority Data

Aug. 31, 2005 (JP) ............... 2005-251207

(51) Int. Cl.
*C03C 3/155* (2006.01)
*C03C 3/14* (2006.01)
*C03C 3/145* (2006.01)
*C03C 3/066* (2006.01)
*C03C 3/15* (2006.01)

(52) U.S. Cl. .............. 501/51; 501/49; 501/50; 501/52; 501/79

(58) Field of Classification Search ........... 501/49, 501/50, 51, 52, 77, 78, 79
See application file for complete search history.

(56) References Cited

U.S. PATENT DOCUMENTS

| | | | |
|---|---|---|---|
| 2002/0073735 A1 | 6/2002 | Hayashi et al. | |
| 2003/0022782 A1* | 1/2003 | Uehara | 501/78 |
| 2003/0211929 A1* | 11/2003 | Hayashi et al. | 501/78 |
| 2004/0106507 A1* | 6/2004 | Kasuga et al. | 501/78 |
| 2004/0145815 A1 | 7/2004 | Endo | |
| 2004/0220041 A1 | 11/2004 | Isowaki et al. | |
| 2005/0011228 A1 | 1/2005 | Hayashi et al. | |
| 2005/0209085 A1 | 9/2005 | Endo | |
| 2006/0194686 A1* | 8/2006 | Kobayashi et al. | 501/50 |
| 2008/0119348 A1* | 5/2008 | Hayashi et al. | 501/78 |

(Continued)

FOREIGN PATENT DOCUMENTS

JP 49-21408 A 2/1974

(Continued)

*Primary Examiner*—Karl E Group
*Assistant Examiner*—Noah S Wiese
(74) *Attorney, Agent, or Firm*—Nixon & Vanderhye P.C.

(57) ABSTRACT

Provided is a precision press-molding optical glass that is not easily degraded in quality by the occurrence of an altered layer such as fogging or yellowing on a surface and that comprises $B_2O_3$, ZnO, $La_2O_3$ and $ZrO_2$ and contains, by mol %, 0 to less than 0.5% of $Li_2O$, 20 to 50% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0.5 to 10% of $ZrO_2$, 0 to 15% of $Ta_2O_5$, 0 to 20% of $WO_3$, 0 to 15% of $Nb_2O_5$, 0 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, the optical glass having an Abbe's number (vd) of at least 35 but less than 40.

14 Claims, 1 Drawing Sheet

U.S. PATENT DOCUMENTS

2008/0194395 A1     8/2008     Endo

FOREIGN PATENT DOCUMENTS

| | | |
|---|---|---|
| JP | 9-278480 A | 10/1997 |
| JP | 2002-201041 A | 7/2002 |
| JP | 2002-362938 | 12/2002 |
| JP | 2004-175632 A | 6/2004 |
| JP | 2004-352604 A | 12/2004 |
| JP | 2005-47732 A | 2/2005 |
| JP | 2005-154260 | 6/2005 |
| JP | 2005-179142 A | 7/2005 |
| WO | WO/2005/042424   * | 5/2005 |

* cited by examiner

OPTICAL GLASS, PRECISION PRESS-MOLDING PREFORM, PROCESS FOR THE PRODUCTION THEREOF, OPTICAL ELEMENT AND PROCESS FOR THE PRODUCTION OF THE ELEMENT

TECHNICAL FIELD

The present invention relates to an optical glass, a precision press-molding preform, a process for the production of the preform, an optical element and a process for the production of the element. More specifically, the present invention relates to an optical glass that is not easily degraded in quality by the occurrence of an altered layer such as a fogging or yellowing on a surface, a precision press-molding preform formed of the glass, a process for the production of the preform, an optical element formed of the above glass and a process for the production of the optical element.

TECHNICAL BACKGROUND

In recent years, a precision press-molding method (also called a mold optics method) draws attention as a method for stably providing a large quantity of optical elements such as an aspherical lens, etc., at a low cost, which optical elements are formed of a high-function glass having properties such as high-refractivity low-dispersion or high-refractivity high-dispersion.

In a precision press-molding method, a low-temperature-softenability optical glass that can be molded at a relatively low temperature is used for reducing the damage to a mold release film provided on a press mold or the molding surface of the mold and for increasing the lifetime of an expensive press mold (for example, see Patent Document 1). As disclosed in JP-A-2002-362938, the above optical glass contains $Li_2O$ as a glass component for decreasing the glass transition temperature and the sag temperature thereof.

Meanwhile, when the above glass is used for precision press-molding, an altered layer such as fogging or yellowing is liable to occur on the surface of a precision press-molded product. Since a lens is defective if it has such a fogging or yellowing on a surface, it is required to remove the fogging or yellowing formed on the surface by polishing or the like. However, if it is required to polish the lens surface of a precision press-molded product for removing the fogging or yellowing, the advantage of the precision press-molding method (providing a large quantity of optical elements at a low cost) can be no longer taken.

DISCLOSURE OF THE INVENTION

Means to Solve the Problems

Under the circumstances, it is an object of the present invention to provide a precision press-molding optical glass that is not easily degraded in quality by the occurrence of an altered layer such as a fogging or yellowing on a surface, a precision press-molding preform formed of the above glass, a process for the production of the preform, an optical element formed of the above glass and a process for the production of the optical element.

Further, it is another object of the present invention to provide a precision press-molding preform excellent in releasability from a press mold and a process for the production of an optical element from the above precision press-molding preform.

MEANS TO SOLVE THE PROBLEMS

For achieving the above objects, the present inventor had made diligent studies and found the following.

That is, an optical glass for precision press-molding contains a relatively large amount of $Li_2O$ as described in JP-A-2002-362938. When the glass is exposed to a press-molding temperature or a high-temperature environment before or after precision press-molding for a long period of time, a fogging or yellowing caused by lithium ion is liable to occur on the glass surface since lithium ion has a large diffusion coefficient. That is, on the glass surface having a high temperature, lithium ion reacts with carbon compounds (such as carbon dioxide, etc.) in the atmosphere, or lithium ion reacts with carbon of a carbon-containing film coated on the glass surface as a mold release film, to generate lithium carbonate. Due to the generation of this carbonate, the lithium ion concentration in the vicinity of the glass surface temporarily decreases. Since, however, lithium ion is easily movable in the glass, lithium ion inside the glass moves toward the glass surface so as to cover a decrease in the lithium ion concentration near the surface, so that the generation of lithium carbonate in the glass surface proceeds.

The present inventor assumed that the thus-formed lithium carbonate causes the fogging and yellowing of the glass, and it has been found that the above object can be achieved by imposing a limitation on the content of lithium to be contained in the glass. The present invention has been completed on the basis of the above finding.

That is, the present invention provides (1) an optical glass that is for use as a glass material for precision press-molding and comprises $B_2O_3$, ZnO, $La_2O_3$ and $ZrO_2$, the optical glass comprising, by mol %, 0 to less than 0.5% of $Li_2O$, 20 to 50% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0.5 to 10% of $ZrO_2$, 0 to 15% of $Ta_2O_5$, 0 to 20% of $WO_3$, 0 to 15% of $Nb_2O_5$, 0 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, the optical glass having an Abbe's number (vd) of at least 35 but less than 40, (2) an optical glass as recited in the above (1), which has an Abbe's number (vd) of at least 35 but not more than 39.5, (3) an optical glass as recited in the above (1) or (2), which has a refractive index (nd) of 1.86 or more, (4) a precision press-molding preform formed of the optical glass recited in any one of the above (1) to (3), (5) a precision press-molding preform as recited in the above (4), which is surface-coated with a carbon-containing film, (6) a precision press-molding preform that is surface-coated with a carbon-containing film and that is formed of a glass having an Abbe's number (vd) of at least 35 but less than 40 and a glass transition temperature (Tg) of 530° C. or higher and containing 0 to less 0.5 mol % of $Li_2O$, (7) a process for the production of a precision press-molding preform, which comprises separating a molten glass gob from a molten glass that is the optical glass recited in any one of the above (1) to (3) and shaping the glass gob into a preform during a cooling step, (8) an optical element formed of the optical glass recited in any one of the above (1) to (3), (9) a process for the production of an optical element, which comprising heating the precision press-molding preform recited in any one of the above (4) to (6) and precision press-molding the preform with a press mold,

(10) a process for the production of an optical element as recited in the above (9), wherein the precision press-molding is followed by removal of the carbon-containing film remaining on the surface of a precision press-molded product obtained, and

(11) a process for the production of an optical element, which comprises the steps of heating a precision press-molding preform formed of a glass and producing a precision press-molded product with a press mold, wherein said preform is the precision press-molding preform recited in any one of the above (4) to (6), said preform and/or the precision press-molded product are/is heat-treated in an atmosphere containing a carbon compound and the temperature for the said heat treatment is higher than a temperature that is 50° C. lower than the glass transition temperature (Tg) of said glass.

EFFECT OF THE INVENTION

According to the present invention, there can be provided an optical glass that is not easily degraded in quality by the occurrence of an altered layer such as a fogging or yellowing on a surface, a precision press-molding preform formed of the above glass, a process for the production of the preform, an optical element formed of the above glass and a process for the production of the optical element.

PREFERRED EMBODIMENTS OF THE INVENTION

Figure 1:
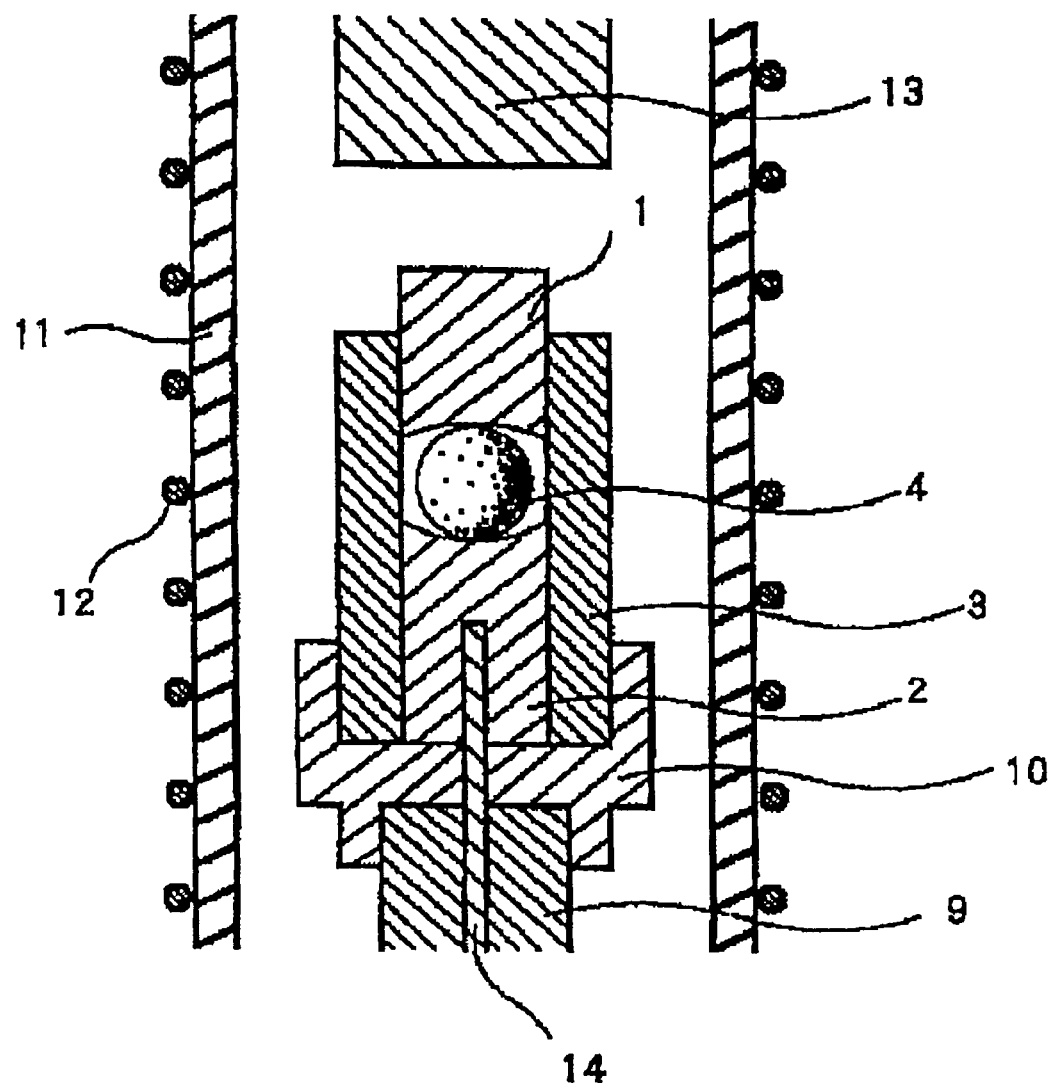
FIG. 1 is a schematic cross-sectional view of a precision press-molding apparatus used in Examples and Comparative Examples.

The optical glass, the precision press-molding preform, the process for the production of the preform, the optical element and the process for the production of the optical element, provided by the present invention, will be explained one by one below.

[Optical Glass]

The optical glass of the present invention is an optical glass that is for use as a glass material for precision press-molding and that contains $B_2O_3$, ZnO, $La_2O_3$ and $ZrO_2$, and the optical glass comprises, by mol %, 0 to less than 0.5% of $Li_2O$, 20 to 50% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0.5 to 10% of $ZrO_2$, 0 to 15% of $Ta_2O_5$, 0 to 20% of $WO_3$, 0 to 15% of $Nb_2O_5$, 0 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, and that it has an Abbe's number (vd) of at least 35 but less than 40.

In the present invention, precision press-molding means that the optical-function surface of an optical element is formed by transferring the molding surface of a press mold to the surface of a preform heated (this term is used in this sense hereinafter). The optical-function surface refers to a surface that refracts, reflects, diffracts or transmits lights in an optical element, and the lens surface of a lens, or the like corresponds to the optical-function surface.

The optical glass of the present invention will be explained below with regard to functions and contents of components thereof, properties of the glass and the process for the production thereof, and contents and total contents of such components shown by % stand for contents and total contents by mol % unless otherwise specified.

In the optical glass of the present invention, the introduction of $Li_2O$ into the glass is limited such that the fogging and yellowing to occur on the glass surface are reduced to a level at which no problem is posed for use as an optical element. That is, in the optical glass of the present invention, the content of $Li_2O$ in the glass is limited to 0 to less than 0.5%. With a decrease in the lithium content in the glass, the risk of occurrence of the fogging and yellowing can be decreased, so that the content of $Li_2O$ introduced is preferably 0.4 mol % or less, more preferably 0.1 mol % or less, still more preferably nil.

$B_2O_3$ is an essential component and plays a role as an oxide that forms a glass network. When a high-refractivity component such as $La_2O_3$ is introduced in a large amount, it is required to introduce 20% or more of $B_2O_3$ as a main network-constituting component to form a glass so that the glass is imparted with sufficient stability against devitrification and that the meltability of the glass is maintained. When the content of $B_2O_3$ exceeds 50%, however, the refractive index of the glass decreases, which is no longer suitable for the object to obtain a high-refractivity glass. The content of $B_2O_3$ is therefore limited to 20 to 50%. For improving the above effect, the content of $B_2O_3$ is preferably 22 to 48%, more preferably 24 to 46%.

$SiO_2$ is an optional component, and when $SiO_2$ is incorporated into a glass containing a large amount of $La_2O_3$ or $Gd_2O_3$, it decreases the liquidus temperature of the glass, improves the high-temperature viscosity thereof and, further, improves the glass stability to a great extent. However, when it is introduced to excess, the refractive index of the glass is decreased, and, further, the glass transition temperature is increased, so that the precision press-molding of the glass is difficult. The content of $SiO_2$ is therefore limited to 0 to 20%, and it is preferably 0 to 18%, more preferably 0.5 to 18%.

ZnO is an essential component, and it decreases the melting temperature, liquidus temperature and transition temperature of the glass and is also indispensable for adjusting the refractive index. In the optical glass of the present invention, the content of $Li_2O$ is limited, so that it is required to introduce more ZnO than in a glass having a usual content of $Li_2O$. On the other hand, when the content of ZnO exceeds 42%, the dispersion becomes large, the stability against devitrification is degraded and the chemical durability is decreased, so that the content of ZnO is limited to the range of 22 to 42%. It is preferably 23 to 41%, more preferably 24 to 40%.

$La_2O_3$ is also an essential component, and it improves the glass in refractivity and chemical durability without decreasing the stability against devitrification or without increasing the dispersion. However, when the content of $La_2O_3$ is less than 5%, no sufficient effects are obtained, and when it exceeds 24%, the stability against devitrification is greatly degraded, so that the content of $La_2O_3$ is limited to 5 to 24%. For enhancing the above effects, the content of $La_2O_3$ incorporated is preferably 6 to 23%, more preferably 7 to 22%.

Like $La_2O_3$, $Gd_2O_3$ is a component that improves the glass in refractivity and chemical durability without degrading the stability of the glass against devitrification and the property of low-dispersion. When the content of $Gd_2O_3$ introduced exceeds 20%, the stability against devitrification is degraded, and the glass transition temperature is increased, so that the precision press-moldability is liable to be degraded. The content of $Gd_2O_3$ is therefore limited to 0 to 20%. For improving the glass in chemical durability while imparting the glass with a high refractive index, it is preferred to introduce 1 to 19% of $Gd_2O_3$, and it is more preferred to introduce 2 to 18% of $Gd_2O_3$. For improving the glass stability, it is preferred to employ a glass composition containing both $La_2O_3$ and $Gd_2O_3$. In particular, when an optical glass is melted and a molten glass gob is separated from the molten glass and shaped into a precision press-molding preform during the cooling of the glass as will be described later, it is important that the glass stability is more improved as described above for preventing the devitrification of the glass during the shaping of the glass.

For obtaining a glass that has an Abbe's number (vd) of less than 40 and has a higher refractive index and stability, the total content of $La_2O_3$ and $Gd_2O_3$ is limited to 10 to 24%, and this total content is preferably 12 to 23%, more preferably 13 to 22%.

$ZrO_2$ is an essential component that is used for realizing a high-refractivity glass and maintaining the low-dispersion property of the glass. The introduction of $ZrO_2$ produces an effect that the glass is improved in high-temperature viscosity and stability against devitrification without decreasing the refractive index of the glass. When the content of $ZrO_2$ exceeds 8%, however, the liquidus temperature is sharply increased and the stability against devitrification is also degraded. The content of $ZrO_2$ is therefore limited to 0.5 to 10%, and it is preferably 1 to 8%, more preferably 1 to 7%.

$Ta_2O_5$ is an optional component that realizes a high-refractivity low-dispersion glass. When a small amount of $Ta_2O_5$ is introduced, it produces an effect that it improves the glass in high-temperature viscosity and stability against devitrification without decreasing the refractive index of the glass. When the content of $Ta_2O_5$ introduced exceeds 15%, however, the liquidus temperature is increased sharply and the dispersion becomes large. The content of $Ta_2O_5$ is therefore limited to 0 to 15%, and it is preferably 0 to 10%, more preferably 0.5 to 10%.

$WO_3$ is a component that is introduced as required for improving the stability and meltability of the glass and improving the refractivity. When the content of $WO_3$ introduced exceeds 20%, the dispersion is becomes large and no required dispersion property can be obtained. The content of $WO_3$ is therefore limited to 0 to 20%, and it is preferably 0 to 18%, more preferably 1 to 18%, particularly preferably 2 to 16%.

$Nb_2O_5$ is an optional component that increases the refractive index of the glass while maintaining the stability. When it is introduced to excess, however, the dispersion is increased. The content of $Nb_2O_5$ is therefore limited to 0 to 15%, and it is preferably 0 to 10%, more preferably 0.5 to 10%.

$TiO_2$ is an optional component that can be introduced for improving the refractivity of the glass. When $TiO_2$ is introduced to excess, however, the dispersion becomes large, and no intended optical constants can be obtained. The content of $TiO_2$ is therefore limited to 0 to 20%, and it is preferably 0 to 18%, more preferably 0.5 to 18%.

$Bi_2O_3$ is an optional component that works to increase the refractive index of the glass and improve the stability of the glass. When it is introduced to excess, however, the stability of the glass is decreased and the liquidus temperature is increased. The content of $Bi_2O_3$ is therefore limited to 0 to 10%, and it is preferably limited to 0 to 6%.

$GeO_2$ is an optional component that works not only to increase the refractive index of the glass but also to improve the stability of the glass. The content of $GeO_2$ is adjusted to 0 to 10%, and it is preferred to adjust the content thereof to 0 to 8%. Since, however, $GeO_2$ is extraordinarily expensive as compared with any other components, it is preferred to introduce no $GeO_2$.

$Ga_2O_3$ is also an optional component that works not only to increase the refractive index of the glass but also to improve the stability of the glass. The content of $GeO_2$ is adjusted to 0 to 10%, and it is preferred to adjust the content thereof to 0 to 8%. Since, however, $Ga_2O_3$ is extraordinarily expensive as compared with any other components, it is preferred to introduce no $Ga_2O_3$.

$Al_2O_3$ is an optional component that increases the high-temperature viscosity of the glass and decreases the liquidus temperature, that works to improve the glass in moldability and that also works to improve the glass in chemical durability. When $Al_2O_3$ is introduced to excess, however, the refractive index is decreased, and the stability against devitrification is decreased. The content of $Al_2O_3$ is therefore limited to 0 to 10%, and it is preferably 0 to 8%.

BaO is an optional component that realize a high-refractivity low-dispersion glass, and when BaO is introduced in a small amount, it improves the stability of the glass and also improves the chemical durability. When the content of BaO introduced exceeds 10%, the stability against devitrification is greatly impaired, and the glass transition temperature and sag temperature are increased. The content of BaO is therefore limited to 0 to 10%, and it is preferably 0 to 8%.

$Y_2O_3$ and $Yb_2O_3$ are optional components that realize a high-refractivity low-dispersion glass. When they are introduced in a small amount, they improve the stability of the glass and improve the chemical durability. When they are introduced to excess, the stability of the glass against devitrification is greatly impaired, and the glass transition temperature and the sag temperature are increased. Therefore, the content of $Y_2O_3$ is limited to 0 to 10% and it is preferably 0 to 8%, and the content of $Yb_2O_3$ is limited to 0 to 10% and it is preferably 0 to 8.

Preferably, the total content of $La_2O_3$, $Gd_2O_3$, $Y_2O_3$ and $Yb_2O_3$ is 10 to 24%.

In addition, $Sb_2O_3$ is optionally added as an anti-foaming agent. When the content of $Sb_2O_3$ exceeds 1% by weight based on the total content of all of glass components, the molding surface of a press mold may be damaged during precision press molding. It is preferred to add $Sb_2O_3$ in an amount of 0 to 1% by weight based on the total content of all of glass components, it is more preferred to add $Sb_2O_3$ in an amount of 0 to 0.5% by weight based on the above total content, and it is still more preferred to add $Sb_2O_3$ in an amount of 0 to 0.1% by weight based on the above total content.

PbO is one of materials whose introduction as a glass component is undesirable. PbO is harmful, and PbO causes a problem that when a preform formed of a glass containing PbO is precision press-molded in a non-oxidizing atmosphere, lead precipitates on the surface of a molded product and impairs the transparency of an optical element or that a metal lead precipitate adheres to a press mold.

$Lu_2O_3$ is not frequently used as a glass component as compared with other general glass components, and it has high scarcity value and is expensive for an optical glass material, so that it is preferred not to introduce $Lu_2O_3$. The optical glass of the present invention can realize a preform suitable for precision press molding without introducing $Lu_2O_3$.

It is also preferred not to introduce any one of environmental-problem-causing elements such as cadmium, tellurium, etc., radioactive elements such as thorium and toxic elements such as arsenic. Further, it is also preferred not to introduce fluorine from the viewpoint of a volatilization problem in the melting of the glass.

The optical glass of the present invention preferably has an Abbe's number (vd) of at least 35 but less than 40 for increasing stability of the glass, and the Abbe's number (vd) is preferably at least 35 but not more than 39.5.

Further, the optical glass of the present invention preferably has a refractive index (nd) of 1.86 or more. There is no restriction to be imposed on the upper limit of the refractive index (nd), and the refractive index (nd) can be increased so long as the object of the present invention can be achieved. For imparting the glass with excellent stability, however, the refractive index (nd) is more preferably 1.95 or less.

The optical glass of the present invention is used in precision press-molding. For preventing the abrasion of a press mold and the damage to a mold release film formed on the molding surface of the mold, the optical glass preferably has a low glass transition temperature (Tg), and the glass transition temperature (Tg) is preferably 630° C. or lower, more preferably 620° C. or lower. On the other hand, the lithium content in the optical glass of the present invention is limited as explained above for preventing fogging and yellowing on the glass surface. When an attempt is made to decrease the glass transition temperature (Tg) to excess, therefore, there may be easily caused a problem that the refractive index decreases or that the glass stability decreases. The glass transition temperature (Tg) is therefore preferably 530° C. or higher, more preferably 540° C. or higher.

The optical glass of the present invention can be obtained by weighing and formulating raw materials such as oxides, carbonates, sulfates, nitrates, hydroxides, etc., so as to obtain an intended glass composition, fully mixing them to prepare a mixture batch, carrying out heating, melting, deaeration and stirring in a melting vessel to prepare a uniform and bubble-free molten glass and shaping or molding it. Specifically, the optical glass can be produced by a known melting method.

[Precision Press-Molding Preform and Process for the Production Thereof]

The precision press-molding preform (to be sometimes simply referred to as "preform" hereinafter) of the present invention will be explained below.

In the present invention, the preform refers to a glass pre-shaped material that is to be heated and precision press-molded.

The preform of the present invention includes two embodiments.

The first embodiment (to be referred to as "preform I" hereinafter) is an embodiment in which the preform of the present invention is formed of the above optical glass of the present invention.

In the preform I, preferably, the surface thereof is coated with a carbon-containing film. The carbon-containing film is desirably a film composed of carbon as a main component (when contents of elements in the film are expressed by atomic %, the content of carbon is greater than the total content of the other elements. Specifically, the carbon-containing film includes, for example, a carbon film and a hydrocarbon film. By coating the surface of a preform with a carbon-containing film, the fusion-bonding of the glass to the mold surface can be prevented during the precision press-molding, and the function of fully spreading the glass in a cavity constituted by the mold during the pressing can be enhanced. From the above viewpoint, the carbon-containing film is preferably a graphite-like carbon film.

As a method for forming the carbon-containing film, there can be employed a known method using a carbon material such as a vacuum vapor deposition method, a sputtering method or an ion plating method, or a known method of thermal decomposition using a feed gas such as a hydrocarbon.

The carbon-containing film exhibits excellent functions during precision press-molding. As described already, however, the present inventor has found that lithium ion in a glass and carbon in the film react with each other in a high-temperature state to generate a carbonate on the glass surface, which has constituted one of causes that bring about fogging or yellowing.

According to the preform I, however, the lithium content in the glass is limited although the preform surface is rich with carbon, so that the fogging and yellowing caused by the generation of a carbonate can be prevented.

In the preform I, the mold release film coated on the preform surface is preferably a carbon-containing film composed of carbon as a main component, while besides it the mold release film may be a self-organized or self-assembled film or the like. The self-organized or self-assembled film can be formed, for example, by bringing the preform I into contact with a liquid material or gaseous material that contains an organic material.

The preform in the second embodiment (to be referred to as "preform II" hereinafter) has a characteristic feature in that it is surface-coated with a carbon-containing film and is formed of a glass having an Abbe's number (vd) of at least 35 but less than 40 and a glass transition temperature (Tg) of 530° C. or higher and containing 0 to less than 0.5 mol % of $Li_2O$.

In the preform II, the carbon-containing film to be coated on the surface thereof is the same as the carbon-containing film explained with regard to the preform I. Further, the preform II has a lithium content in a preferred range or more preferred range each of which is as discussed with regard to the optical glass of the present invention.

The glass constituting the preform II has an Abbe's number (vd) of at least 35 but less than 40, and for increasing the stability of the glass, the glass preferably has an Abbe's number (vd) of at least 35 but 39.5 or less.

Further, the preform II is constituted of a glass having a relatively high glass transition temperature (Tg) of as high as 530° C. or higher, for an optical glass for use in precision press-molding.

When the glass transition temperature is high, the temperature in precision press-molding and the stain point of the glass also become high. As is well known, the strain point can be an index for a treatment temperature at which a strain in the glass is reduced. Therefore, the preform II can be placed under a relatively high temperature for a press-molding temperature in a state where the carbon-containing film exists on the surface thereof, and a precision press-molded product obtained by precision press-molding can be also annealed at a relatively high temperature in a state where the carbon-containing film similarly exists on the surface thereof. With an increase in the press molding temperature or the annealing temperature, a reaction between lithium ion in the glass and carbon present in a film on the glass surface is more promoted. In the preform II, the lithium content in the glass is limited as explained above, so that even with rich carbon on the surface an optical element free of fogging and yellowing can be obtained by precision press-molding.

The above explanation can also apply to a case where the preform I is surface-coated with a carbon-containing film and is formed of a glass having a glass transition temperature (Tg) of 530° C. or higher.

Lithium carbonate that is considered to be a cause for the fogging and yellowing of the glass is not only generated by a reaction between carbon present in the carbon-containing film and lithium ion in the glass constituting a preform but is also generated by a reaction between carbon in a carbon-containing atmosphere and lithium ion in the glass constituting the preform or a precision press-molded product under a high-temperature condition.

For example, lithium carbonate can be generated when a preform is heated for forming a film on the preform surface in a carbon-containing atmosphere, e.g., in atmosphere or when a precision press-molded product is annealed. In the preforms I and II, however, the lithium content in the glass for each is limited, so that the fogging and yellowing problems of the glass can be overcome.

The optical glass constituting the preform II preferably has a glass composition containing $B_2O_3$, ZnO and $La_2O_3$ as glass components and more preferably has a glass composition containing $B_2O_3$, ZnO, $La_2O_3$ and $Gd_2O_3$ as glass components. And, concerning the contents of $B_2O_3$, ZnO, $La_2O_3$ and $Gd_2O_3$, preferably, the content of $B_2O_3$ is 20 to 50 mol %, the content of ZnO is 22 to 42 mol %, the content of $La_2O_3$ is 5 to 24 mol % and the content of $Gd_2O_3$ is 0 to 20 mol %. When importance is attached in particular to the glass stability, more preferably, the content of ZnO is 23 to 41 mol %, the content of $La_2O_3$ is 7 to 22 mol % and the content of $Gd_2O_3$ is 2 to 18 mol %. The glass for constituting the preform II preferably has a glass composition explained with regard to the optical glass of the present invention.

Further, the glass for constituting the preform II preferably has a refractive index (nd) and an Abbe's number (vd) that are explained with regard to the optical glass of the present invention.

The process for the production of a preform, provided by the present invention, will be explained below.

The process for the production of a preform, provided by the present invention, comprises separating a molten glass gob from a molten glass that is the optical glass of the present invention and shaping the glass gob into a preform during a cooling step. The above process is suitable for the production of the above preforms I and II.

In a specific example, the optical glass of the present invention is fully melted, refined and homogenized to prepare a molten glass and the molten glass is caused to flow out of a flow nozzle or flow pipe that is temperature-adjusted, to produce the above preform.

The temperature adjustment is carried out, for example, by a method in which the temperature of the flow nozzle or flow pipe is controlled. The material for the flow nozzle or flow pipe is desirably platinum or a platinum alloy. Specifically, the method for producing the preform includes (a) a method in which a molten glass is caused to drop from a flow nozzle as a drop having a predetermined weight and received with a receiving member to shape it into a preform, (b) a method in which a molten glass drop having a predetermined weight is caused to drop in liquid nitrogen or the like to shape it into a preform and (c) a method in which a molten glass flow is caused to flow down from a flow pipe made of platinum or platinum alloy, the leading end of the molten glass flow is received with a receiving member, a narrow portion is formed between the nozzle side portion and receiving member side portion of the molten glass flow, then, the molten glass flow is separated in the narrow portion and a molten glass gob having a predetermined weight is received with the receiving member to shape it into a preform.

For producing a preform having a smooth surface free of flaws, soiling or surface alteration, for example, a free surface, there is employed a method in which a molten glass gob is shaped into a preform over a shaping mold while it is caused to float by applying a gas pressure, a method in which a molten glass drop is introduced into a medium (such as liquid nitrogen) prepared by liquefying a gaseous substance (such as nitrogen) at room temperature under atmospheric pressure to shape it into a preform or some other method.

When a molten glass gob is shaped into a preform while it is caused to float, a gas (called "floating gas") is blown to the molten glass gob so that a gas pressure is upwardly applied to it. In this case, when the viscosity of the molten glass gob is too low, floating gas enters the glass and remain in the preform in the form of bubbles. However, the viscosity of the molten glass gob is adjusted to 3 to 60 dPa·s, whereby the glass gob can be caused to float without letting the floating gas enter the glass.

The gas with which the preform is caused to float includes air, $N_2$ gas, $O_2$ gas, Ar gas, He gas and steam. The gas pressure is not specially limited so long as the preform can float without coming into contact with a solid such as the surface of a mold.

In the process for the production of a preform, provided by the present invention, the weight of the molten glass gob is determined such that it is accurately in agreement with the weight of an intended preform. Various precision press-molded products are obtained by precision press-molding preforms of the present invention. When the preform weight is too small as compared with the weight of a precision press-molded product, there is caused a problem that since the glass is not fully filled on the molding surface of a press mold during precision press-molding, no intended surface accuracy can be obtained or the thickness of a precision press-molded product is not so thick as the intended thickness. Further, when the weight of a preform is too large, there is caused a problem that excess glass enters a gap of press mold members to form molding burrs or that the thickness of a molded product is larger than the intended thickness. It is therefore required to control the weight of the precision press-molding preform more accurately than a general press-molding preform. For this reason, the weight of a molten glass gob is determined such that it is accurately in agreement with the weight of a preform.

In the above manner, there can be obtained a preform whose entire surface is formed by solidification of a glass in a molten state or a preform whose entire surface is formed by solidification of a glass and is not machined or a preform whose entire surface is a free surface. When such a preform is formed, there can be obtained a smooth surface (free of a grinding mark and a polishing mark). The above preform is preferred as a preform of the present invention. The free surface as used herein refers to a surface that is formed without any contact to a solid and hence without transferring a surface form of the solid in a process in which a glass in a molten state or softened state is cooled. Specifically, a glass in a molten state or softened state is cooled while it is caused to float by applying a gas pressure to the glass, whereby there can be produced a preform whose entire surface is formed by solidification of a glass in a molten state or a preform whose entire surface is a free surface.

The optical element produced from the preform of the present invention includes many optical elements having a rotational symmetry axis each such as a lens, so that the form of the preform is therefore desirably a form having a rotational symmetry axis. Specifically, there is, for example, a sphere or a form having one rotational symmetry axis. The form having one rotational symmetry axis includes forms having a smooth contour line free of a corner and a dent in a cross section including the above rotational symmetric axis, such as a form having the contour line of an ellipse of which the minor axis corresponds to the rotational symmetric axis in the above cross section, or a form obtained by shrinking a sphere into a flat form (a form obtained by selecting one axis passing through the center of a sphere and shrinking the sphere in the above axis direction).

The process for the production of a preform, provided by the present invention, is suitable for the production of the preform I or II, while the process for the production of the preform I or II shall not be limited to the above process. The preform I or II can be produced by a method in which a refined and homogenized molten glass is cast into a mold to form a shaped material, then, the shaped material is annealed to remove a strain, it is divided into pieces having predetermined dimensions and form each by cutting or splitting and the surface of each is smoothened by grinding or polishing to obtain a preform having a predetermined weight.

[Optical Element and Process for the Production Thereof]

The optical element of the present invention is characteristically formed of the above optical glass of the present invention.

Examples of the optical element include lenses such as an aspherical lens, a spherical lens, a plano-concave lens, a plano-convex lens, a biconcave lens, a biconvex lens, a convex meniscus lens, a concave meniscus lens, etc., a microlens, a lens array, a lens with a diffraction grating, a prism, a prism with a lens function, and the like. The surface of the optical element may be provided with an anti-reflection film, a partial reflection film having wavelength selectivity or the like as required.

According to the optical element of the present invention, there can be provided a high-quality optical element free of fogging and yellowing on a surface, and in particular there can be provided an optical element having high-refractivity low-dispersion properties and having an excellent surface state.

The process for the production of an optical element, provided by the present invention, includes the following two embodiments.

The first embodiment (to be referred to as "optical element production process I" hereinafter) comprises heating the preform of the present invention and precision press-molding it with a press mold.

In the optical element production process I, the lithium content in the glass constituting the preform is limited, so that there can be prevented the occurrence of fogging and yellowing caused by a reaction between carbon outside the glass and lithium ion in the glass, and there can be produced an optical element having an excellent surface state by precision press-molding. In particular even if a carbon-containing film is present on the preform surface, there is not generated lithium carbonate that causes fogging and yellowing by reacting with carbon in the film, so that the mold releasability in precision press-molding can be improved by coating a preform with the carbon-containing film and that the glass can be improved in elongation during press-molding.

The precision press-molding uses a press mold of which the molding surface is highly accurately processed in advance, and a mold release film may be formed on the molding surface for preventing the fusion-bonding of glass during pressing. The mold release film includes a carbon-containing film, a nitride film and a noble metal film, and the carbon-containing film preferably includes a hydrogenated carbon film and a carbon film. In the precision press-molding, a preform is supplied between a pair of upper and lower mold members having molding surfaces that are accurately processed with regard to forms, then, the mold and the preform are together temperature-increased by heating them to a temperature corresponding to an optical glass viscosity of $10^5$ to $10^9$ dPa·s, to soften the preform, and the preform is press-molded, whereby the form of the molding surfaces can be transferred to the preform.

In another embodiment, a preform that is temperature-increased to a temperature corresponding to a glass viscosity of $10^4$ to $10^8$ dPa·s in advance is supplied between a pair of opposed upper and lower mold members having molding surfaces that are accurately processed with regard to forms, and the preform is press-molded, whereby the form of the molding surfaces can be transferred to the preform.

The pressure and time period for pressing can be determined as required by taking account of the viscosity, etc., of an optical glass, and the pressing can be carried out, for example, under a pressure of approximately 5 to 15 MPa for a time period of 10 to 30 seconds. Pressing conditions such as a press time period, a pressure, etc., can be determined in known ranges as required depending upon the form and dimensions of a press-molded product.

The precision press-molding and the heating of the preform before the precision press-molding are preferably carried out in the atmosphere of a non-oxidizing gas such as nitrogen gas or a mixture of nitrogen gas with hydrogen gas, for preventing the oxidation of the molding surface of a press mold or a mold release film formed on the molding surface.

In the non-oxidizing gas atmosphere, the carbon-containing film coating the surface of a preform is not oxidized and remains on the surface of a precision press-molded product. It is finally required to remove the above film, and as a method for relatively easily and completely removing the carbon-containing film, there is employed a method in which the precision press-molded product is heated in an oxidizing atmosphere, for example, in atmosphere. As another method, there is employed a method in which the precision press-molded product is subjected to oxygen plasma ashing or a method in which the precision press-molded product is etched. In the method in which the precision press-molded product is heated in an oxidizing atmosphere to remove the carbon-containing film, the heating temperature is selected from temperatures at which the molded product is not thermally deformed, specifically, from the range of temperatures that are lower than the glass transition temperature. According to the present invention, the lithium content in the glass constituting the precision press-molded product is limited, so that there is no case where carbon in the carbon-containing film or carbon dioxide in atmosphere reacts with lithium ion in the glass to generate lithium carbonate on the glass surface. Therefore, the carbon-containing film can be removed while preventing the fogging and yellowing of the glass.

After the press-molding, the mold and the glass molded product are cooled, and preferably when the glass molded product comes to have a temperature of a strain point or lower, the mold is opened and the glass molded product is taken out. For exactly adjusting optical properties to predetermined values, conditions for annealing the glass molded product such as an annealing rate during the cooling may be adjusted as required.

The second embodiment (to be referred to as "optical element production process 2" hereinafter) is a process for the production of an optical element which comprises the steps of heating a precision press-molding preform formed of a glass and producing a precision press-molded product with a press mold, wherein said preform is a preform of the present invention, said preform and/or the precision press-molded product is heat-treated in an atmosphere containing a carbon compound and the temperature for the said heat treatment is higher than a temperature that is 50° C. lower than the glass transition temperature (Tg) of said glass.

The optical element production process 2 is mainly a process that prevents the fogging or yellowing which is caused on the glass surface by carbon present in an ambient atmosphere when a preform or a precision press-molded product is heat-treated.

Specifically, when a precision press-molded product is annealed in atmosphere containing a carbon compound such as carbon dioxide to reduce or remove a strain, or when a preform is heated in a gas atmosphere containing a carbon compound to form a carbon-containing film on the preform surface, it is considered that if the heat-treatment temperature for the annealing or for forming the film is higher than a temperature that is lower than the glass transition temperature by 50° C. (if the heat treatment temperature is higher than (Tg-50)° C.), lithium carbonate is formed on the surface of a glass containing lithium and causes the fogging or yellowing. It is thinkable to decrease the heat treatment temperature for suppressing the generation of the carbonate. Since, however, the time period required for the heat treatment and the heat treatment temperature have a relationship shown by the following expression (3) (in which A and B are constants), the time period required for the heat treatment is greatly increased if the heat treatment temperature is decreased, so that it is difficult to carry out practical heat treatment.

$$\text{Time period required for heat treatment} = B \times \exp(-A/\text{heat treatment temperature}) \quad (3)$$

However, according to the present invention, the content of lithium in the glass, which lithium is considered a cause to generate the carbonate, is limited, so that the fogging and yellowing on the glass surface can be prevented while it is made possible to carry out the heat treatment within a practical time period. In the optical element production process 2, the preform is preferably the preform I or the preform II.

A precision press-molding mold, a method of using the precision press-molding mold and use conditions thereof in the optical element production process 2 are like those explained with regard to the above optical element production process 1.

The atmosphere for the molding is preferably non-oxidizing for protecting the mold surface and a mold release film formed on the preform surface. For the non-oxidizing atmosphere, an inert gas such as argon or nitrogen, a reducing gas such as hydrogen or a mixture of an inert gas with a reducing gas can be used. Preferably, nitrogen gas or a mixture of nitrogen gas with a small amount of hydrogen gas can be used.

As a method of taking a precision press-molded product out of a press mold after the press-molding, there is similarly employed the method that is described with regard to the above optical element production process I.

EXAMPLES

The present invention will be explained more in detail with reference to Examples and Comparative Examples hereinafter, while the present invention shall not be limited by these Examples.

Various properties of optical glasses were measured by the following methods.

(1) Refractive index (nd) and Abbe's number (νd)

Measurement was made according to the refractive index measurement method of Japan Optical Glass Industry Society Standard. An apparatus used was "GMR-1" supplied by Kalnew Optical Corporation. A glass specimen subjected to the measurement was prepared by temperature-decreasing an optical glass held between a glass transition temperature (Tg) and a sag temperature (Ts) at a temperature decrease rate of −30° C./hour.

(2) Glass transition temperature (Tg), sag temperature and average thermal expansion coefficient (α)

Measurement was made with an apparatus for thermomechanical analysis "TMA8510" supplied by Rigaku Corporation at a temperature elevation rate of 4° C./minute under a load of 98 mN. In addition, α is an average thermal expansion coefficient between 100° C. and 300° C.

(3) Specific Gravity

Measurement was made by an Archimedean method.

Examples 1-29

Oxides, carbonates, sulfates, nitrates, hydroxides, etc., such as $H_3BO_3$, $La_2O_3$, $ZnO$, $ZnCO_3$, $Gd_2O_3$, $ZrO_2$, etc., as raw materials for introducing components for a glass composition shown in Tables 1 to 3 were weighed to obtain a glass raw material having a weight of 250 to 300 g and fully mixed to prepare a formulated batch. The batch was placed in a platinum crucible and melted in air for 2 to 4 hours in an electric furnace held at 1,200 to 1450° C. After the melting, a molten glass was cast into a 40×70×15 mm mold made of carbon, allowed to cool to a transition temperature and placed in an annealing furnace immediately after the cooling, and the glass was annealed in a glass transition temperature range for approximately 1 hour and then allowed to cool to room temperature in the furnace to give an optical glass. In glasses obtained in the above manner, there was no precipitate of a crystal observable through a microscope.

Table 4 shows properties of the thus-obtained optical glasses.

Then, an environment in precision press-molding was created by increasing the temperature of the glass to a temperature corresponding more or less to a press-molding temperature under a condition where carbon was present outside the glass, to test the glass surface for a change. In this test, 29 samples having free surfaces and having glass compositions corresponding to those of Examples 1 to 29 were prepared, and each sample was separately placed in a stainless steel container together with a compound that would generate carbon dioxide by thermal decomposition. In this state, each sample was heated to a temperature that was lower than a glass transition temperature by 10° C., held for 3 hours and then cooled to room temperature, and each sample was taken out of the stainless steel container and the surface thereof was visually observed and also magnified and observed through an optical microscope. As a result, no fogging was observed on each sample, and when the sample surfaces were magnified and observed through the optical microscope, they were found to be smooth.

Comparative Example 1

Optical glasses containing more than 0.5 mol % of $Li_2O$ were prepared in the same manner as in Examples 1 to 29.

Then, samples having glass compositions corresponding to the compositions of the above glasses were prepared and tested for a change on surfaces in the same manner as in Examples 1 to 29. As a result, they were visually observed to show clear fogging, and when they were magnified and observed through an optical microscope, it was observed that particulate products were generated all over the surfaces thereof.

TABLE 1

|  |  | Example 1 | Example 2 | Example 3 | Example 4 | Example 5 | Example 6 |
|---|---|---|---|---|---|---|---|
| $Li_2O$ | mol % | 0.00 | 0.00 | 0.00 | 0.00 | 0.00 | 0.00 |
|  | wt % | 0.00 | 0.00 | 0.00 | 0.00 | 0.00 | 0.00 |
| $B_2O_3$ | mol % | 29.50 | 30.77 | 29.23 | 30.77 | 30.08 | 30.08 |
|  | wt % | 13.76 | 14.05 | 12.99 | 14.44 | 14.68 | 14.01 |
| $SiO_2$ | mol % | 10.73 | 7.69 | 7.69 | 7.69 | 7.52 | 7.52 |
|  | wt % | 4.32 | 3.03 | 2.95 | 3.11 | 3.17 | 3.02 |
| $ZnO$ | mol % | 26.05 | 27.69 | 27.69 | 27.69 | 27.07 | 27.07 |
|  | wt % | 14.21 | 14.78 | 14.38 | 15.19 | 15.44 | 14.73 |
| $La_2O_3$ | mol % | 16.86 | 13.85 | 14.62 | 13.85 | 13.53 | 13.53 |
|  | wt % | 36.80 | 29.59 | 30.39 | 30.40 | 30.91 | 29.50 |
| $Gd_2O_3$ | mol % | 3.07 | 4.62 | 5.38 | 4.62 | 4.51 | 4.51 |
|  | wt % | 7.44 | 10.98 | 12.46 | 11.28 | 11.46 | 10.94 |
| $ZrO_2$ | mol % | 4.60 | 3.08 | 3.08 | 3.08 | 3.01 | 3.01 |
|  | wt % | 3.80 | 2.49 | 2.42 | 2.56 | 2.60 | 2.48 |
| $Ta_2O_5$ | mol % | 3.83 | 4.62 | 4.62 | 2.31 | 2.26 | 2.26 |
|  | wt % | 11.34 | 13.38 | 13.02 | 6.87 | 6.99 | 6.67 |
| $WO_3$ | mol % | 5.36 | 7.69 | 7.69 | 7.69 | 7.52 | 12.03 |
|  | wt % | 8.33 | 11.70 | 11.38 | 12.02 | 12.22 | 18.66 |
| $Nb_2O_5$ | mol % | 0.00 | 0.00 | 0.00 | 2.31 | 0.00 | 0.00 |
|  | wt % | 0.00 | 0.00 | 0.00 | 4.13 | 0.00 | 0.00 |
| $TiO_2$ | mol % | 0.00 | 0.00 | 0.00 | 0.00 | 4.51 | 0.00 |
|  | wt % | 0.00 | 0.00 | 0.00 | 0.00 | 2.53 | 0.00 |
| Total | mol % | 100.00 | 100.00 | 100.00 | 100.00 | 100.00 | 100.00 |
|  | wt % | 100.00 | 100.00 | 100.00 | 100.00 | 100.00 | 100.00 |

|  |  | Example 7 | Example 8 | Example 9 | Example 10 | Example 11 | Example 12 |
|---|---|---|---|---|---|---|---|
| $Li_2O$ | mol % | 0.00 | 0.00 | 0.00 | 0.00 | 0.00 | 0.00 |
|  | wt % | 0.00 | 0.00 | 0.00 | 0.00 | 0.00 | 0.00 |
| $B_2O_3$ | mol % | 30.08 | 29.23 | 29.32 | 28.57 | 29.55 | 28.15 |
|  | wt % | 15.10 | 14.12 | 13.48 | 13.58 | 13.97 | 13.98 |
| $SiO_2$ | mol % | 7.52 | 7.52 | 7.52 | 7.52 | 6.06 | 7.41 |
|  | wt % | 3.26 | 3.12 | 2.98 | 3.08 | 2.47 | 3.18 |
| $ZnO$ | mol % | 27.07 | 27.07 | 27.07 | 27.07 | 27.27 | 26.67 |
|  | wt % | 15.89 | 15.24 | 14.55 | 15.04 | 15.08 | 15.49 |
| $La_2O_3$ | mol % | 13.53 | 14.29 | 14.29 | 15.04 | 15.15 | 14.81 |
|  | wt % | 31.80 | 32.20 | 30.74 | 33.44 | 33.53 | 34.44 |
| $Gd_2O_3$ | mol % | 4.51 | 4.51 | 4.51 | 4.51 | 4.55 | 4.44 |
|  | wt % | 11.79 | 11.31 | 10.80 | 11.16 | 11.19 | 11.50 |
| $ZrO_2$ | mol % | 3.01 | 3.01 | 3.01 | 3.01 | 3.03 | 2.96 |
|  | wt % | 2.67 | 2.56 | 2.45 | 2.53 | 2.54 | 2.61 |
| $Ta_2O_5$ | mol % | 0.00 | 2.26 | 2.26 | 2.26 | 2.27 | 0.74 |
|  | wt % | 0.00 | 6.89 | 6.58 | 6.80 | 6.82 | 2.34 |
| $WO_3$ | mol % | 7.52 | 7.52 | 12.03 | 7.52 | 7.58 | 7.41 |
|  | wt % | 12.57 | 12.06 | 18.42 | 11.90 | 11.93 | 12.25 |
| $Nb_2O_5$ | mol % | 2.26 | 0.00 | 0.00 | 0.00 | 0.00 | 0.00 |
|  | wt % | 4.32 | 0.00 | 0.00 | 0.00 | 0.00 | 0.00 |
| $TiO_2$ | mol % | 4.51 | 4.51 | 0.00 | 4.51 | 4.55 | 7.41 |
|  | wt % | 2.60 | 2.49 | 0.00 | 2.46 | 2.47 | 4.22 |
| Total | mol % | 100.00 | 100.00 | 100.00 | 100.00 | 100.00 | 100.00 |
|  | wt % | 100.00 | 100.00 | 100.00 | 100.00 | 100.00 | 100.00 |

TABLE 2

|  |  | Example 13 | Example 14 | Example 15 | Example 16 | Example 17 | Example 18 |
|---|---|---|---|---|---|---|---|
| $Li_2O$ | mol % | 0.00 | 0.00 | 0.00 | 0.00 | 0.00 | 0.00 |
|  | wt % | 0.00 | 0.00 | 0.00 | 0.00 | 0.00 | 0.00 |
| $B_2O_3$ | mol % | 28.57 | 28.15 | 28.57 | 29.01 | 29.01 | 27.74 |
|  | wt % | 14.02 | 13.55 | 13.17 | 13.61 | 13.20 | 13.24 |
| $SiO_2$ | mol % | 7.52 | 7.41 | 7.52 | 7.63 | 7.63 | 7.30 |
|  | wt % | 3.18 | 3.08 | 2.99 | 3.09 | 3.00 | 3.01 |
| $ZnO$ | mol % | 27.07 | 26.67 | 27.07 | 27.48 | 27.48 | 26.28 |
|  | wt % | 15.52 | 15.00 | 14.58 | 15.07 | 14.61 | 14.67 |
| $La_2O_3$ | mol % | 15.04 | 14.81 | 15.04 | 15.27 | 15.27 | 14.60 |
|  | wt % | 34.52 | 33.37 | 32.43 | 33.52 | 32.50 | 32.62 |
| $Gd_2O_3$ | mol % | 4.51 | 4.44 | 4.51 | 4.58 | 4.58 | 4.38 |
|  | wt % | 11.52 | 11.14 | 10.83 | 11.19 | 10.85 | 10.89 |
| $ZrO_2$ | mol % | 3.01 | 2.96 | 3.01 | 3.05 | 3.05 | 5.84 |
|  | wt % | 2.61 | 2.52 | 2.45 | 2.54 | 2.46 | 4.93 |
| $Ta_2O_5$ | mol % | 2.26 | 0.74 | 2.26 | 3.82 | 3.82 | 2.19 |
|  | wt % | 7.02 | 2.26 | 6.60 | 11.37 | 11.02 | 6.64 |

TABLE 2-continued

|  |  |  |  |  |  |  |  |
|---|---|---|---|---|---|---|---|
| WO$_3$ | mol % | 4.51 | 10.37 | 10.53 | 4.58 | 7.63 | 7.30 |
|  | wt % | 7.37 | 16.62 | 16.16 | 7.16 | 11.56 | 11.61 |
| Nb$_2$O$_5$ | mol % | 0.00 | 0.00 | 0.00 | 0.00 | 0.00 | 0.00 |
|  | wt % | 0.00 | 0.00 | 0.00 | 0.00 | 0.00 | 0.00 |
| TiO$_2$ | mol % | 7.52 | 4.44 | 1.50 | 4.58 | 1.53 | 4.38 |
|  | wt % | 4.23 | 2.45 | 0.80 | 2.47 | 0.80 | 2.40 |
| Total | mol % | 100.00 | 100.00 | 100.00 | 100.00 | 100.00 | 100.00 |
|  | wt % | 100.00 | 100.00 | 100.00 | 100.00 | 100.00 | 100.00 |

|  |  | Example 19 | Example 20 | Example 21 | Example 22 | Example 23 | Example 24 |
|---|---|---|---|---|---|---|---|
| Li$_2$O | mol % | 0.00 | 0.00 | 0.00 | 0.00 | 0.00 | 0.00 |
|  | wt % | 0.00 | 0.00 | 0.00 | 0.00 | 0.00 | 0.00 |
| B$_2$O$_3$ | mol % | 28.57 | 28.57 | 28.57 | 28.57 | 28.57 | 28.15 |
|  | wt % | 13.89 | 13.46 | 13.37 | 13.79 | 12.97 | 13.14 |
| SiO$_2$ | mol % | 7.52 | 7.52 | 7.52 | 7.52 | 7.52 | 7.41 |
|  | wt % | 3.15 | 3.06 | 3.04 | 3.13 | 2.95 | 2.98 |
| ZnO | mol % | 27.07 | 27.07 | 27.07 | 27.07 | 27.07 | 28.15 |
|  | wt % | 15.38 | 14.90 | 14.81 | 15.27 | 14.36 | 15.36 |
| La$_2$O$_3$ | mol % | 15.04 | 15.04 | 15.04 | 15.04 | 15.04 | 14.81 |
|  | wt % | 34.21 | 33.15 | 32.93 | 33.97 | 31.95 | 32.36 |
| Gd$_2$O$_3$ | mol % | 4.51 | 4.51 | 4.51 | 4.51 | 4.51 | 4.44 |
|  | wt % | 11.42 | 11.06 | 10.99 | 11.34 | 10.66 | 10.80 |
| ZrO$_2$ | mol % | 6.02 | 6.02 | 3.01 | 3.01 | 3.01 | 2.96 |
|  | wt % | 5.17 | 5.01 | 2.49 | 2.57 | 2.42 | 2.45 |
| Ta$_2$O$_5$ | mol % | 2.26 | 2.26 | 2.26 | 2.26 | 2.26 | 0.74 |
|  | wt % | 6.96 | 6.74 | 6.70 | 6.91 | 6.50 | 2.19 |
| WO$_3$ | mol % | 4.51 | 7.52 | 9.02 | 6.02 | 12.03 | 13.33 |
|  | wt % | 7.30 | 11.79 | 14.06 | 9.67 | 18.19 | 20.72 |
| Nb$_2$O$_5$ | mol % | 0.00 | 0.00 | 0.00 | 0.00 | 0.00 | 0.00 |
|  | wt % | 0.00 | 0.00 | 0.00 | 0.00 | 0.00 | 0.00 |
| TiO$_2$ | mol % | 4.51 | 1.50 | 3.01 | 6.02 | 0.00 | 0.00 |
|  | wt % | 2.52 | 0.81 | 1.61 | 3.33 | 0.00 | 0.00 |
| Total | mol % | 100.00 | 100.00 | 100.00 | 100.00 | 100.00 | 100.00 |
|  | wt % | 100.00 | 100.00 | 100.00 | 100.00 | 100.00 | 100.00 |

TABLE 3

|  |  | Example 25 | Example 26 | Example 27 | Example 28 | Example 29 |
|---|---|---|---|---|---|---|
| Li$_2$O | mol % | 0.00 | 0.00 | 0.00 | 0.00 | 0.00 |
|  | wt % | 0.00 | 0.00 | 0.00 | 0.00 | 0.00 |
| B$_2$O$_3$ | mol % | 28.15 | 28.15 | 29.01 | 29.01 | 33.14 |
|  | wt % | 13.34 | 13.55 | 13.00 | 13.40 | 16.82 |
| SiO$_2$ | mol % | 7.41 | 7.41 | 7.63 | 7.63 | 0.00 |
|  | wt % | 3.03 | 3.08 | 2.95 | 3.04 | 0.00 |
| ZnO | mol % | 28.15 | 28.15 | 27.48 | 27.48 | 30.86 |
|  | wt % | 15.59 | 15.83 | 14.40 | 14.84 | 18.31 |
| La$_2$O$_3$ | mol % | 14.81 | 14.81 | 15.27 | 15.27 | 10.29 |
|  | wt % | 32.85 | 33.37 | 32.02 | 33.00 | 24.44 |
| Gd$_2$O$_3$ | mol % | 4.44 | 4.44 | 4.58 | 4.58 | 8.82 |
|  | wt % | 10.97 | 11.14 | 10.69 | 11.02 | 23.31 |
| ZrO$_2$ | mol % | 2.96 | 2.96 | 3.05 | 3.05 | 4.41 |
|  | wt % | 2.49 | 2.52 | 2.42 | 2.50 | 3.96 |
| Ta$_2$O$_5$ | mol % | 0.74 | 0.74 | 3.82 | 3.82 | 0.00 |
|  | wt % | 2.23 | 2.26 | 10.86 | 11.19 | 0.00 |
| WO$_3$ | mol % | 11.85 | 10.37 | 9.16 | 6.11 | 4.41 |
|  | wt % | 18.70 | 16.62 | 13.67 | 9.39 | 7.45 |
| Nb$_2$O$_5$ | mol % | 0.00 | 0.00 | 0.00 | 0.00 | 0.73 |
|  | wt % | 0.00 | 0.00 | 0.00 | 0.00 | 1.42 |
| TiO$_2$ | mol % | 1.48 | 2.96 | 0.00 | 3.05 | 7.35 |
|  | wt % | 0.81 | 1.64 | 0.00 | 1.62 | 4.28 |
| Total | mol % | 100.00 | 100.00 | 100.00 | 100.00 | 100.00 |
|  | wt % | 100.00 | 100.00 | 100.00 | 100.00 | 100.00 |

TABLE 4

|  | Tg (° C.) | Ts (° C.) | α(×10−7/° C.) | nd | vd | Specific gravity |
|---|---|---|---|---|---|---|
| Example 1 | 614 | 661 | 79 | 1.8618 | 39.3 | 5.31 |
| Example 2 | 603 | 650 | 76 | 1.8656 | 37.8 | 5.40 |
| Example 3 | 607 | 655 | 79 | 1.8771 | 37.6 | 5.52 |
| Example 4 | 599 | 645 | 77 | 1.8698 | 37.0 | 5.25 |
| Example 5 | 599 | 645 | 78 | 1.8706 | 36.4 | 5.23 |
| Example 6 | 597 | 643 | 77 | 1.8675 | 37.1 | 5.36 |
| Example 7 | 596 | 641 | 79 | 1.8753 | 35.5 | 5.08 |
| Example 8 | 603 | 649 | 79 | 1.8773 | 36.2 | 5.29 |
| Example 9 | 598 | 643 | 76 | 1.8702 | 36.8 | 5.42 |
| Example 10 | 604 | 650 | 80 | 1.8830 | 36.1 | 5.33 |
| Example 11 | 603 | 649 | 80 | 1.8848 | 36.1 | 5.34 |
| Example 12 | 601 | 647 | 81 | 1.8856 | 35.2 | 5.21 |
| Example 13 | 607 | 653 | 81 | 1.8856 | 35.9 | 5.23 |
| Example 14 | 600 | 645 | 80 | 1.8816 | 35.5 | 5.30 |
| Example 15 | 601 | 646 | 80 | 1.8784 | 36.5 | 5.42 |
| Example 16 | 609 | 657 | 80 | 1.8826 | 36.8 | 5.35 |
| Example 17 | 607 | 653 | 79 | 1.8797 | 37.0 | 5.45 |
| Example 18 | 605 | 652 | 81 | 1.8822 | 36.4 | 5.25 |
| Example 19 | 610 | 659 | 81 | 1.8816 | 37.2 | 5.27 |
| Example 20 | 608 | 653 | 80 | 1.8789 | 37.3 | 5.37 |
| Example 21 | 604 | 649 | 80 | 1.8807 | 36.2 | 5.37 |
| Example 22 | 606 | 652 | 81 | 1.8843 | 36.0 | 5.28 |
| Example 23 | 600 | 645 | 80 | 1.8762 | 36.7 | 5.46 |
| Example 24 | 593 | 637 | 81 | 1.8715 | 36.7 | 5.40 |
| Example 25 | 595 | 639 | 81 | 1.8739 | 36.5 | 5.37 |
| Example 26 | 596 | 642 | 77 | 1.8759 | 36.2 | 5.32 |
| Example 27 | 605 | 653 | 80 | 1.8777 | 37.2 | 5.48 |
| Example 28 | 607 | 654 | 78 | 1.8813 | 36.9 | 5.40 |
| Example 29 | 600 | 639 | 80 | 1.8792 | 36.4 | 5.30 |

Example 30

Preforms were prepared from the glasses of Examples 1 to 29 in the following manner.

First, a molten glass maintained at 1,050 to 1,450° C. (corresponding to a glass viscosity of 4 to 0.05 dPa·s) in an electric furnace was caused to flow down at a constant rate from a pipe made of platinum alloy that was temperature-adjusted to 1,050° C. (corresponding to a glass viscosity of 4 dpa·s), and a leading end of a molten glass flow was received with a glass preform shaping mold. The shaping mold was caused to move downward at a rate fully greater than the downward flowing rate of the molten glass flow at a time when a molten glass gob having a predetermined weight was separable from the above leading end, to separate the molten glass gob. When the molten glass was caused to flow down, the glass had a viscosity of 7 dPa·s.

The separated molten glass gob was shaped into a spherical glass preform and annealed while it was caused to float over the above shaping mold by applying a gas pressure. It was set that the glass preform had a weight in the range of 0.01 to 5 g. Each molten glass gob and a glass preform corresponding thereto had equal weights, and the weight accuracy of such preforms was within ±1% based on the set weight.

In each of the thus-prepared glass preforms, the entire surface was formed by solidification of a molten glass and was a free surface. Further, defects such as striae, devitrification, breaking, bubbles, etc., were not found on any surface or inside any preform.

Example 31

Precision press-molded products were obtained from the glass preforms prepared in Example 30 in the following manner. A glass preform 4 was placed between an upper mold member 1 and a lower mold member 2 which were made of SiC and had molding surfaces coated with a carbon-containing film (diamond-like carbon film) each. Then, a nitrogen atmosphere was created in a quartz tube 11, and a heater 12 is electrically powered to heat inside the quartz tube 11. The temperature in the mold was increased to a temperature at which the molding glass preform 4 had a viscosity of approximately $10^5$ to $10^9$ dpa·s, and then while this temperature was maintained, a pressing rod 13 was moved downward to press the upper mold member 1 from above to press the molding glass preform 4 in the mold. The pressure for the pressing was set at 5 to 15 MPa, and the pressing time period was set to be 10 to 300 seconds long. After the pressing, the pressure for the pressing was removed, a glass molded product obtained by press-molding in an aspherical form was gradually cooled to a glass transition temperature in a state where the glass molded product was in contact with the upper mold member 1 and the lower mold member 2. Then, the glass molded product was rapidly cooled to a temperature around room temperature and a glass molded in an aspherical form was taken out of the mold. In FIG. 1, numeral 3 indicates a sleeve, 10 indicates a support bed, 9 indicates a support rod and 14 indicates a thermocouple.

The thus-obtained precision press-molded products were annealed in atmosphere at 560° C. for 3 hours to give aspherical lenses. The obtained lenses were visually observed to show no fogging, and when they were magnified and observed through an optical microscope, their surfaces were found to be smooth. The refractive indexes (nd) and Abbe's numbers (vd) of the above lenses were in agreement with values of the optical glasses forming the above glass preforms.

While the aspherical lenses were produced in this Example, various optical elements such as a spherical lens, a microlens, a lens array, a diffraction grating, a lens with a diffraction grating, a prism, a prism with a lens function, etc., can be produced by selecting forms and dimensions of a press mold as required. An optical multi-layered film such as an anti-reflection film or the like can be formed on the surface of each of the various optical elements.

Comparative Example 2

Aspherical lenses were produced from the glasses used in Comparative Example 1 by the same steps as those in Examples 30 and 31 under the same conditions as those in Examples 30 and 31. The surfaces of the thus-obtained lenses were visually observed to show fogging, and when they were magnified and observed through an optical microscope, it was found that particulate products were generated all over the surfaces.

INDUSTRIAL UTILITY

The optical glass of the present invention is a precision press-molding optical glass that is not easily degraded in quality by the occurrence of an altered layer such as fogging or yellowing on a surface, and it is suitably used for producing optical elements having excellent quality through precision press-molding preforms.

The invention claimed is:

1. An optical glass that is for use as a glass material for precision press-molding and comprises $B_2O_3$, ZnO, $La_2O_3$ and $ZrO_2$,
the optical glass comprising, by mol %, 0 to less than 0.5% of $Li_2O$, 20 to 50% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0.5 to 10% of $ZrO_2$, 0 to 15% of $Ta_2O_5$, 0 to 20 % of $WO_3$, 0 to 15% of $Nb_2O_5$, 0 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, and the glass is essentially free of tellurium, the optical glass having an Abbe's number (vd) of at least 35 but less than 40.

2. An optical glass that is for use as a glass material for precision press-molding and comprises $B_2O_3$, ZnO, $La_2O_3$ and $ZrO_2$, the optical glass comprising, by mol %, 0 to less than 0.5% of $Li_2O$, 20 to 50% of $B_2O_3$, 0 to 20% of $SiO_2$, 22 to 42% of ZnO, 5 to 24% of $La_2O_3$, 0 to 20% of $Gd_2O_3$, and 0.5 to 20% of $TiO_2$, provided that the total content of $La_2O_3$ an $Gd_2O_3$ is 10 to 24%, 0.5 to 10% of $ZrO_2$, 0 to 15% of $Ta_2O_5$, 0 to 20% of $WO_3$, 0 to 15% of $Nb_2O_5$, 0.5 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% Of $Y_2O_3$ and 0 to 10% of $Yb_2O_3$, the optical glass having an Abbe's number (vd) of at least 35 but less than 40.

3. An optical glass that is for use as a glass material for precision press-molding and comprises $B_2O_3$, ZnO, $La_2O_3$ and $ZrO_2$, the optical glass comprising, by mol %, 0 to less than 0.5% of $Li_2O$, 20 to 50% of $B_2O_3$, 0 to 20% of $SiO_2$, 26.05 to 42% of ZnO, 5 to 24% of $La_2O_3$, 0 to 20% of $Gd_2O_3$, provided that the total content of $La_2O_3$ and $Gd_2O_3$ is 10 to 24%, 0.5 to 10% of $ZrO_2$, 0 to 15% of $Ta_2O_5$, 0 to 20% of $WO_3$, 0 to 15% of $Nb_2O_5$, 0 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, the optical glass having an Abbe's number (vd) of at least 35 but less than 40.

4. An optical glass that is for use as a glass material for precision press-molding and comprises $B_2O_3$, ZnO, $La_2O_3$ and $ZrO_2$, the optical glass comprising, by mol %, 0 to less than 0.5% of $Li_2O$, 20 to 50% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0.5 to 10% of $ZrO_2$, 0 to 15% of $Ta_2O_5$, 0 to 20 % of $WO_3$, 0 to 15% of $Nb_2O_5$, 0 to 20% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, and the glass is essentially free of $Ga_2O_3$, the optical glass having an Abbe's number (vd) of at least 35 but less than 40.

5. The optical glass of any of claims 1-4, wherein the $TiO_2$ content is 1.42-20 mol %.

6. The optical glass of 1-4, which has an Abbe's number (vd) of at least 35 but not more than 39.5.

7. The optical glass of claims 1-4, which has a refractive index (nd) of 1.86 or more.

8. A precision press-molding preform formed of the optical glass of any of claims 1-4.

9. The precision press-molding preform of claim 8, which is surface-coated with a carbon-containing film.

10. A process for the production of a precision press-molding preform, which comprises separating a molten glass gob from a molten glass that is the optical glass of any of claims 1-4 and shaping the glass gob into a preform during a cooling step.

11. An optical element formed of the optical glass of any of claims 1-4.

12. A process for the production of an optical element, which comprising heating the precision press-molding preform of claim 8 and precision press-molding the preform with a press mold.

13. The process for the production of an optical element as recited in claim 12, wherein the precision press-molding is followed by removal of the carbon-containing film remaining on the surface of a precision press-molded product obtained.

14. A process for the production of an optical element, which comprises the steps of heating a precision press-molding preform formed of a glass and producing a precision press-molded product with a press mold, wherein said preform is the precision press-molding preform of claim 4, said preform And/or the precision press-molded product are/is heat-treated in an atmosphere containing a carbon compound and the temperature for the said heat treatment is higher than a temperature that is 50° C. lower than the glass transition temperature (Tg) of said glass.

* * * * *